(12) United States Patent
Chan et al.

(10) Patent No.: US 11,367,047 B2
(45) Date of Patent: Jun. 21, 2022

(54) METHOD AND APPARATUS TO IMPROVE COMPUTER AND DATABASE SYSTEMS FOR LOCATION, OPERATION, CALL, UPDATE, AND SUPPLY

(71) Applicant: Gulf Oil Marine Limited, Hong Kong (CN)

(72) Inventors: Kwan Yin Philip Chan, Hong Kong (CN); Cheuk Fai Szeto, Hong Kong (CN); Safiul Karim Gazi, Hong Kong (CN)

(73) Assignee: Gulf Oil Marine Limited, Hong Kong (CN)

( * ) Notice: Subject to any disclaimer, the term of this patent is extended or adjusted under 35 U.S.C. 154(b) by 353 days.

(21) Appl. No.: 16/464,965

(22) PCT Filed: Nov. 29, 2017

(86) PCT No.: PCT/IB2017/001564
§ 371 (c)(1),
(2) Date: May 29, 2019

(87) PCT Pub. No.: WO2018/100426
PCT Pub. Date: Jun. 7, 2018

(65) Prior Publication Data
US 2019/0318308 A1    Oct. 17, 2019

Related U.S. Application Data

(60) Provisional application No. 62/514,404, filed on Jun. 2, 2017, provisional application No. 62/427,386, filed on Nov. 29, 2016.

(51) Int. Cl.
*B63B 49/00* (2006.01)
*G06Q 10/08* (2012.01)
(Continued)

(52) U.S. Cl.
CPC ......... *G06Q 10/0875* (2013.01); *G06Q 10/04* (2013.01); *G06Q 30/0201* (2013.01); *G06Q 30/0206* (2013.01)

(58) Field of Classification Search
CPC ............... G06Q 10/0875; G06Q 10/04; G06Q 30/0201; G06Q 30/0206
See application file for complete search history.

(56) References Cited

U.S. PATENT DOCUMENTS

| 6,879,962 B1 | 4/2005 | Smith et al. |
| 2009/0187450 A1* | 7/2009 | Kocis .................. G06Q 10/083 705/331 |

(Continued)

FOREIGN PATENT DOCUMENTS

CN           105844363 A       8/2016

*Primary Examiner* — Talia F Crawley
(74) *Attorney, Agent, or Firm* — Hunton Andrews Kurth LLP (57) ABSTRACT

A method of improving computer and database systems for location, operation, call, update, and supply of product, in particular industrial lubricant products, to vessels at ports located across the world, comprising: first generating, by a processor, a first ranking of a plurality of ports based on locational data of the vessel and net delivery costs of the lubricant product at the plurality of ports; then generating, by the processor, a second ranking of the plurality of ports based on lubricant-supplying facilities present at the plurality of ports and market clearing prices of the lubricant product at the plurality of ports; then selecting one of the plurality of the ports based on the first ranking and the second ranking; also, supplying the lubricant product to the vessel at the selected port.

9 Claims, 6 Drawing Sheets

(51) Int. Cl.
    *G06Q 10/04*        (2012.01)
    *G06Q 30/02*        (2012.01)

(56)            References Cited

U.S. PATENT DOCUMENTS

2009/0192864  A1*   7/2009   Song ................... G06Q 10/087
                                                      705/28
2010/0287073  A1*  11/2010   Kocis .............. G06Q 10/08355
                                                      705/28
2010/0332273  A1*  12/2010   Balasu .................. G06Q 99/00
                                                     705/332
2011/0215948  A1*   9/2011   Borgerson ......... G06Q 10/0831
                                                     340/989
2014/0058775  A1*   2/2014   Siig ....................... G06Q 10/06
                                                    705/7.12
2014/0163664  A1*   6/2014   Goldsmith ......... A61B 17/0057
                                                    623/1.11
2015/0134558  A1*   5/2015   Murray ............. G06Q 10/0833
                                                     705/333
2016/0320191  A1*  11/2016   Yamaguchi ............. B63B 49/00
2017/0039500  A1*   2/2017   Leidner ................ G06F 16/951

* cited by examiner

METHOD AND APPARATUS TO IMPROVE COMPUTER AND DATABASE SYSTEMS FOR LOCATION, OPERATION, CALL, UPDATE, AND SUPPLY

CROSS-REFERENCE TO RELATED APPLICATIONS

This is a national phase application based on the PCT International Patent Application No. PCT/IB2017/001564 filed Nov. 29, 2017, claiming priority to United States provisional application Ser. Nos. 62/427,386 and 62/514,404, filed Nov. 29, 2016 and Jun. 2, 2017 respectively, the disclosures of which are all incorporated herein by reference in their entireties.

FIELD OF THE INVENTION

The present disclosure relates to a computer system and improvements to a computer system to control the supply of industrial lubricant products in the marine industry. Specifically, the present disclosure relates to improvements in computer and database systems to operationally and economically optimize the supply of industrial lubricant products to vessels at ports located across the world.

BACKGROUND

Ocean-going vessels are typically equipped with large two-stroke or four-stroke marine engines. Two-stroke marine engines are total loss lubrication systems; in other words, two-stroke marine engines burn lubricants. Although lubricated by closed-loop systems, four-stroke marine engines have substantial lubricant top-up requirements. In addition to propulsion systems, each vessel has cargo hatches, propellers, winches, cranes, generators, compressors, and a whole host of other equipment that also require lubrication.

While vessels typically sail for at least 250-300 days in a year, they cannot hold 250-300 days' worth of lubricant supplies on board. Therefore, when a vessel needs lubricants, it has to be supplied with lubricants at a port of call along its journey. Ports of call are few and infrequent, making the lubricant supply chain critical to maintain continuous undisrupted operation of the vessel. Lubricant supplying companies are contracted to supply one vessel or a fleet of vessels with lubricant products at ports located across the world. The transient nature of the trade makes supply planning a continuously moving target. It also makes it difficult for the lubricant supplying companies to outline a focused value proposition because the ports of call mix for a vessel might change at short notice and accordingly might the value proposition.

Inventory planning of lubricant products has historically been a very simplistic method, which typically involves the lubricant supplying companies looking at sales data of a range of lubricant products at a number of ports over a predetermined number of months, averaging the sales data using a moving average approach, and using the resulting average to estimate possible growth figures and plan for stocks of lubricant products to be put in place at the corresponding ports. Due to the inaccurate and unpredictable nature of the business, at any point in time, there is about twice as much lubricant inventory as is required anywhere in the world. Excessive and unnecessary lubricant inventory is obviously undesirable.

Additionally, customer acquisition by the lubricant supplying companies has generally been based on a high-level knowledge of the marine industry. For example, in some cases, salesmen from the companies' sales offices, located at ports, would go through all vessels that dock at the ports, approach managers or owners of the vessels, and query them about the types of lubricant products required by their vessels and their needs for such lubricant products. Usually, the companies would not have any information about vessels until the companies are contracted to supply the vessels. As such, prospecting has been undertaken in a very crude fashion, and success levels of delivering lubricant products have been very low. For example, the success levels are in the range of 80 to 85%, which means that 15 to 20% of deliveries are usually missed.

Computerized systems to address the problems in this environment have quite a number of shortcomings and have not been successful. Such systems tend to be individualized and lead to the same type of guesswork as to how to properly supply these types of products in the field. A large majority of these systems are adaptations of geographically stationary demand models and thus do not address the transient demand model of the marine lubricant industry.

Thus, there remains a need for a method and system for a lubricant supplying company to operationally and economically optimize its supply of lubricant products to vessels at ports globally. The method should allow the company to, among other things, streamline its sales pitches to existing and prospective clients, plan its demand and capacity, plan its inventory and production, dynamically identify trade changes to realign its inventory and production and execute pricing strategies which aligns the vessels' needs to the company's locations of strength thereby maintaining a competitive edge over its competitors.

DETAILED DESCRIPTION

Embodiments of the present disclosure solve several shortcomings that are typically faced by a lubricant supplying company (hereinafter "company"). For example, as discussed in the Background section, the lack of sophistication in the inventory planning of lubricant products has not led to reliable supply of the lubricant products, and customer acquisition has mostly been based on human knowledge and interaction. Demand planning of lubricant products has been based on an extrapolated, linear exercise.

In particular, there have been no links between the different stages of planning and supply of lubricant products. Moreover, data analytics has not been used to help prospect for new vessels or devise sales pitches of lubricant products to existing and new customers.

Embodiments of the present disclosure may provide a method and apparatus to improve computer and database systems for location, operation, call, update, and supply of product, in particular industrial lubricant products, to vessels at ports located across the world. In a method according to an embodiment, first generating, by a processor, a first ranking of a plurality of ports based on locational data of the vessel and net delivery costs of the lubricant product at the plurality of ports. Then generating, by the processor, a second ranking of the plurality of ports based on lubricant-supplying facilities present at the plurality of ports and market clearing prices of the lubricant product at the plurality of ports. Then selecting one of the plurality of the ports based on the first ranking and the second ranking. Also, supplying the lubricant product to the vessel at the selected port.

Embodiments of the present invention provide an electronic device including one or more processors and memory storing instructions adapted to be executed by the one or more processors to perform operations. The operations may include generating, by a processor, a first ranking of a plurality of ports based on locational data of the vessel and net delivery costs of the lubricant product at the plurality of ports; generating, by the processor, a second ranking of the plurality of ports based on lubricant-supplying facilities present at the plurality of ports and market clearing prices of the lubricant product at the plurality of ports; selecting one of the plurality of the ports based on the first ranking and the second ranking; and supplying the lubricant product to the vessel at the selected port.

In the embodiments, two databases (not shown in FIGS. 1-6) may be maintained internally by the company: a Global Warehouse database and a Global Supplier database. The Global Warehouse database is a warehouse-port matrix, mapping about 5000 ports to about 65 warehouses. The ports and warehouses are located globally. Every port may be mapped to a warehouse. The Global Supplier database is a supplier-port matrix, mapping the about 5000 ports to 35 suppliers globally.

Figure 1:
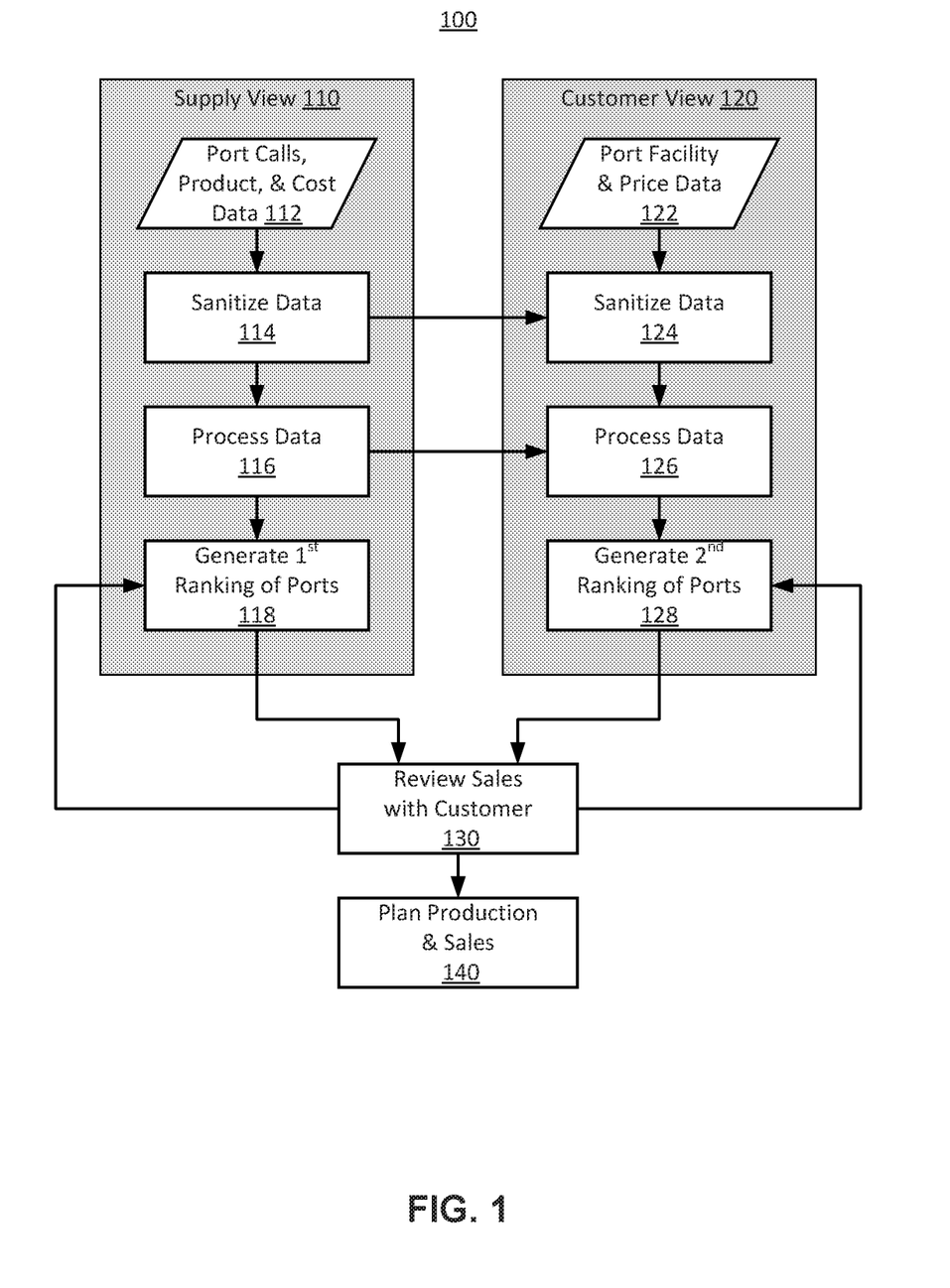
FIG. 1 is a flowchart depicting a method of optimizing a supply of a lubricant product to a vessel, according to an embodiment of the present disclosure.

FIG. 1 is a flowchart depicting a method 100 of optimizing a supply of a lubricant product to a vessel, according to an embodiment of the present disclosure. FIG. 1 includes two interrelated paths—a supply view 110 and a customer view 120. In the supply view 110, the method 100 retrieves data containing port calls made by vessels, lubricant products used by vessels, and costs of the lubricant products from one or more databases at step 112, sanitizes the data at step 114 to allow for accurate cross-referencing of the data, processes the data at step 116, and generates a first ranking of a plurality of ports for every vessel out of a plurality of vessels, from the company's supply point of view. In the customer view 120, the method 100 retrieves data containing lists of port facilities at ports and prices for the lubricant products from one or more databases at step 122, sanitizes the data at step 124 with input from step 114, processes the data at step 126 with input from step 116, and generates a second ranking of the plurality of ports for every vessel out of the plurality of vessels, from the company's customers' point of view. The supply view 110 and the customer view 120 will be described in details below with respect to FIGS. 2 and 3, respectively.

[20] In FIG. 1, at step 130, based on the first and second rankings of the plurality of the ports, the method 100 allows the company to review, with its customers, sales of one or more lubricant products for one or more of the customers' vessels. The method 100 allows the company to arrive at the best value proposition for the customers in selecting ports that are economically and operationally optimal for the supply of lubricant products to the customers' vessels. Based on the review with the customers, the company may adjust how the method 100 generates the first and second ranking of the plurality of ports. At step 140, the method 100 then allows the company to plan for capacity in a future horizon, inventory, production, and supply of lubricant products required by its customers' vessels. At this stage, the method 100 also enables the company to develop new sales pitches to prospective customers.

Figure 2:
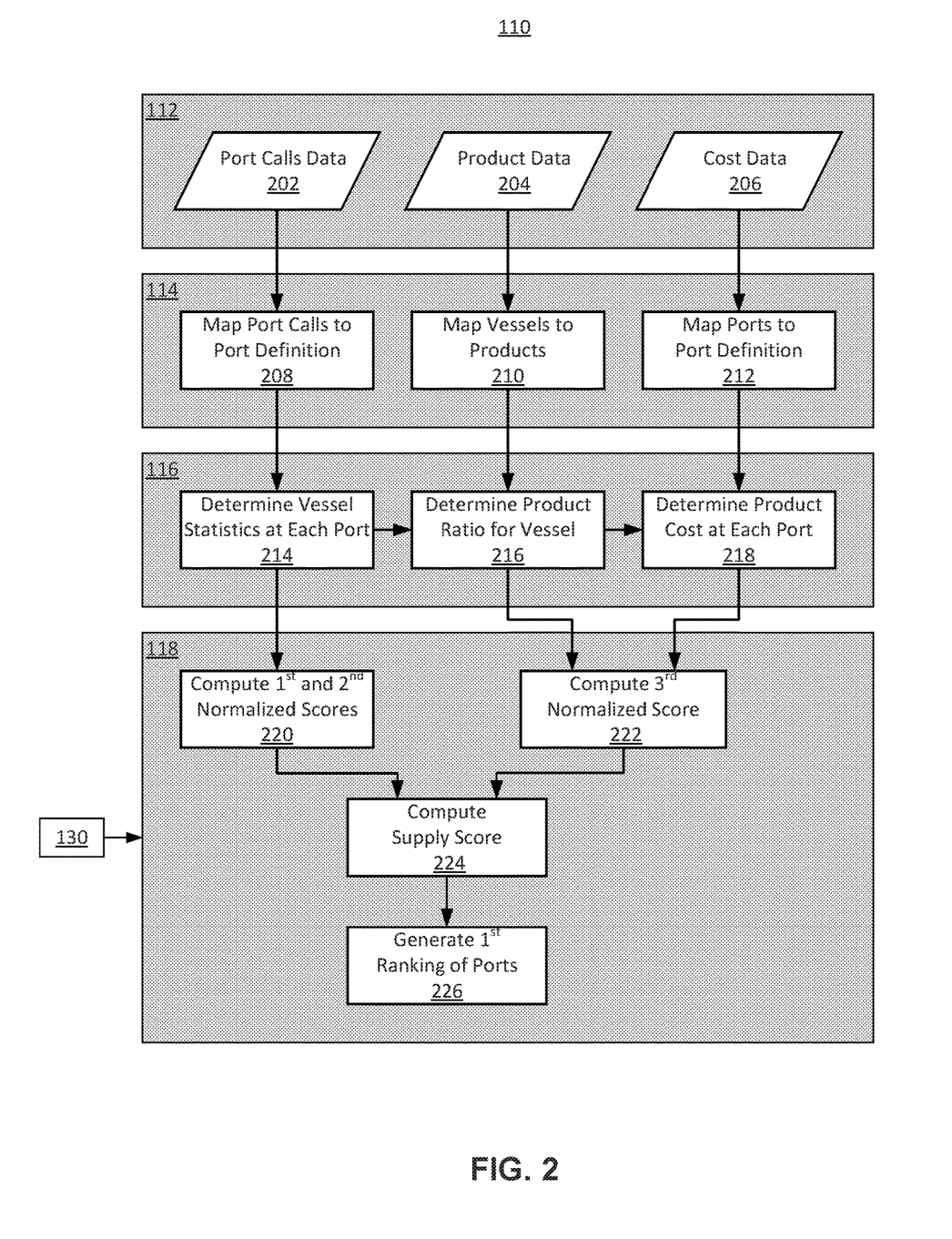
FIG. 2 is a flowchart depicting a supply view of the method of FIG. 1, according to an embodiment of the present disclosure.

FIG. 2 is a flowchart depicting the supply view 110 of the method 100 in FIG. 1, according to an embodiment of the present disclosure. In particular, FIG. 2 is a detailed view of the above-described steps 112, 114, 116, and 118 of the supply view 110.

At step 202, the method 100 retrieves port calls data for as many vessels as are publicly tracked from one or more databases, over a predetermined period of time (e.g., 3-, 6-, 12-month period, etc.). Such databases may be Automatic Identification System (AIS) databases. The AIS is an automatic tracking system used on ships and vessel traffic services (VTS) for identifying and locating vessels by electronically exchanging data with other nearby ships, AIS base stations, and satellites. The International Maritime Organization (IMO) mandates that any vessel, which is above 300 metric tons, always has an AIS transponder on, in order to avoid collisions, traffic, etc. Every time that such a vessel moves, its movement is represented by a vector, which gets recorded as AIS data on an AIS tracker. Each vessel is assigned a unique IMO number and may be identified by its IMO number in the AIS databases. The regulation requires AIS to be fitted aboard all ships of 300 gross tonnage and upwards engaged on international voyages, cargo ships of 500 gross tonnage and upwards not engaged on international voyages and all passenger ships irrespective of size.

Therefore, based on the recorded AIS data, the starting and ending locations (i.e., port calls) of every tracked vessel, the speed at which the vessel was moving, etc. may be deduced. Vendors, such as Sea-web™, IHS Markit (AIS-Live), Platts (cFlow), and Lloyd's List Intelligence, consolidate AIS data in databases, from which a trade pattern for each vessel over the period of time may be extracted. As will be apparent herein, port calls made by vessels worldwide form the foundation of the method 100. It is to be appreciated that the present disclosure is not limited AIS data and that any data that provide locational information about vessels may be employed by the method 100.

The method 100 retrieves lubricant product data from a product database, which is maintained by the company, at step 204. The product database includes a list of lubricant products for every vessel (by IMO number, for example) contracted to the company. Whenever a vessel is contracted to the company, a technical lubrication recommendation chart is generated for the vessel and stored in the product database. The product database also includes historical sales data categorized by vessel and engine type. While the product database does not include product information for vessels that are not contracted to the company, as will be described below, these vessels may be matched to vessels of the same type and same engine configuration in the product database. Essentially, the product database maintains a vessel-machinery-product matrix.

At step 206, the method 100 retrieves cost data from a cost database, which is also maintained by the company. The cost database typically holds the cost configuration of an entire value chain of the company. Specifically, the cost database maintains molecule costs and delivery costs of every lubricant product that may be supplied by the company at every port serviced by the company. It is to be noted that the same lubricant product may have different net delivery costs at different ports. The cost database further includes details on how and where the molecules are created, and how and where they are delivered to customers.

As mentioned previously, at step 114, the method 100 sanitizes the data retrieved at step 112. This is to ensure that data retrieved from databases originating from different sources may be cross-referenced to provide reliable and accurate outputs.

For example, the method 100 may map the port calls data to ports listed in the company's port directory and the company's competitors' port directories, which are collectively referred to as the Port Definition herein. While a port is looked at as a whole and having one port name in the Port Definition, a port call may identify specific areas of a port such as anchorages and terminals, which are not relevant to the method 100. Therefore, at step 208, the method 100 goes through every port call to identify a port name (e.g., "Singapore" in "Singapore Anchorage") that matches a port name in the Port Definition. The method 100 may also resolve ambiguities such as "Korea, South" versus "South Korea" or "Houston, TX" versus "Houston-TX."

Alternatively, at step 208, the method 100 may pick a central coordinate for a port name in the Port Definition and group, under the corresponding port name, all port calls with coordinates falling within a given distance of the central coordinate. The method 100 may also build an exception table for any port call that cannot be mapped to a port name in the Port Definition. Such an unmapped port call may be resolved manually offline by an operator, for example. The accuracy of this step can be enhanced by using a freeform operation which maps anchorages and terminals by name to ports can be reverse engineered to outline a coordinate based freeform around the central port coordinate. Any port call which is an anchorage or terminal at a given distance from a set of pre-determined points in the freeform can be mapped to the central port coordinate. This minimizes the number of unmapped port calls.

At step 210, the method 100 maps vessels with IMO numbers in the port calls data but not contracted to the company to vessels of the same type and same engine configuration in the product data. The method 100 may match vessels based on whether the vessels originated from the same shipyard, use the same engine type or model, and were built around the same era. For example, if the vessel not contracted to the company corresponds to a tanker with a specific engine, the method 100 searches for a tanker having a similar engine in the Product database. Once the mapping is completed, the company's product database effectively gets augmented to include vessels that are not contracted to the company.

Similarly to the port calls data, the method 100 sanitizes the cost data at step 212 by mapping ports, which are linked to the costs of lubricant products at the corresponding port, to the Port Definition, as described above. The ports, being consistent across the data to be processed by the method 100, thus allow these data to be correctly and accurately cross-referenced, without ambiguity.

Once the method 100 completes the data sanitization at steps 208, 210, and 212, the method 100 starts cross-referencing the sanitized data and processing data therein at step 116.

At step 214, for each vessel represented by a unique IMO number in the port calls data, for the predetermined period of time, the method 100 goes through the port calls data and accumulates the number of hours that the vessel spent at each port. The method 100 then counts the number of calls that the vessel has made at every port along its trade pattern. The method 100 may further determine the average time the vessel has spent during such a call and the standard deviation of the time spent for the set of calls. The method 100 may also locate the last timestamp/occurrence for every port and compute the number of days the vessel sailed on sea. The method 100 may exclude port(s) at which the vessel has spent less than 24 hours. Essentially, at step 214, the method 100 searches for the port at which each vessel spends most of its time. For the ports the company already services it has set up a database which measures the efficiency of each port. For example in Singapore or Rotterdam a delivery can be completed at 6-7 hours' notice whereas in Rio de Janeiro a similar delivery might require 14-15 hours. The method 100 uses this information to exclude ports where the vessel spends less time than the notice period so the method will exclude Singapore if a vessel only spends 2 hours there on average.

At step 216, the method 100 cross-references the IMO numbers of vessels from the port calls data with the product data. In other words, the method 100 searches, in the product database, for each vessel represented by a unique IMO number in the port calls data. It is to be recalled that, at step 210, vessels not contracted by the company have already been mapped to a vessel of the same type and same engine configuration, and included in the product database. Then, the method 100 determines all the lubricant products required by each vessel over the predetermined period of time, and computes a product ratio for each vessel in terms of volumes of the lubricants. The lubricant product that accounts for the largest volume may thus be deduced for each vessel from the product ratio.

Thereafter, at step 218, for each vessel, the method 100 cross-references the product which accounts for the largest volume (determined in step 216) and the ports along the trade pattern of the vessel with the cost data. As such, the method 100 determines the net delivery cost of the vessel's most-needed lubricant product at every port visited by the vessel over the predetermined period of time. From a supply point of view, the port with the lowest net delivery cost is desirable.

For each vessel, at step 220, the method 100 computes a first normalized score for each port based on the vessel's number of calls at the port and a second normalized score based on the vessel's average hours spent at the port and, at step 222, a third normalized score based on the net delivery cost of the vessel's most-needed lubricant product at the port. The port with the lowest net delivery cost is assigned the highest third normalized score.

At step 224, the method 100 applies a weighting to the first, second, and third normalized scores to rank each port for each vessel, from the company's supply point of view. For example, the weighting may be in a ratio of 30% of the first normalized score, 10% of the second normalized score, and 60% of the third normalized score. It is to be appreciated that the ratio may be adjusted based on the performance of the method 100 and the goals of the company. These percentages may be modified depending on market conditions. For example, in a shipping industry market focused on price, 10%, 10%, and 80% may be used as the ratio values for the first, second, and third normalized scores. Furthermore, the ratios may take into account the market sentiment via a set of indices. For example if the Baltic dry index is falling precipitously and Brent crude is creeping upward, the 80% ratio to the third normalized score could be adjusted since customers would be highly price sensitive at this instance and would even tailor their port call times to obtain cheaper lubricants.

Therefore, the method 100 assigns each port an overall normalized score and ranks each port accordingly for each vessel at step 226, from the company's supply point of view. The method 100 thus generates the first ranking of the plurality of ports. The first ranking allows the company to identify the port with the highest overall normalized score as the port that provides the most comfortable time period or window of opportunity to supply each vessel with its most-needed lubricant product at the most economical cost. In other words, the first ranking allows the company to identify its best lubricant product delivery point(s).

Figure 3:
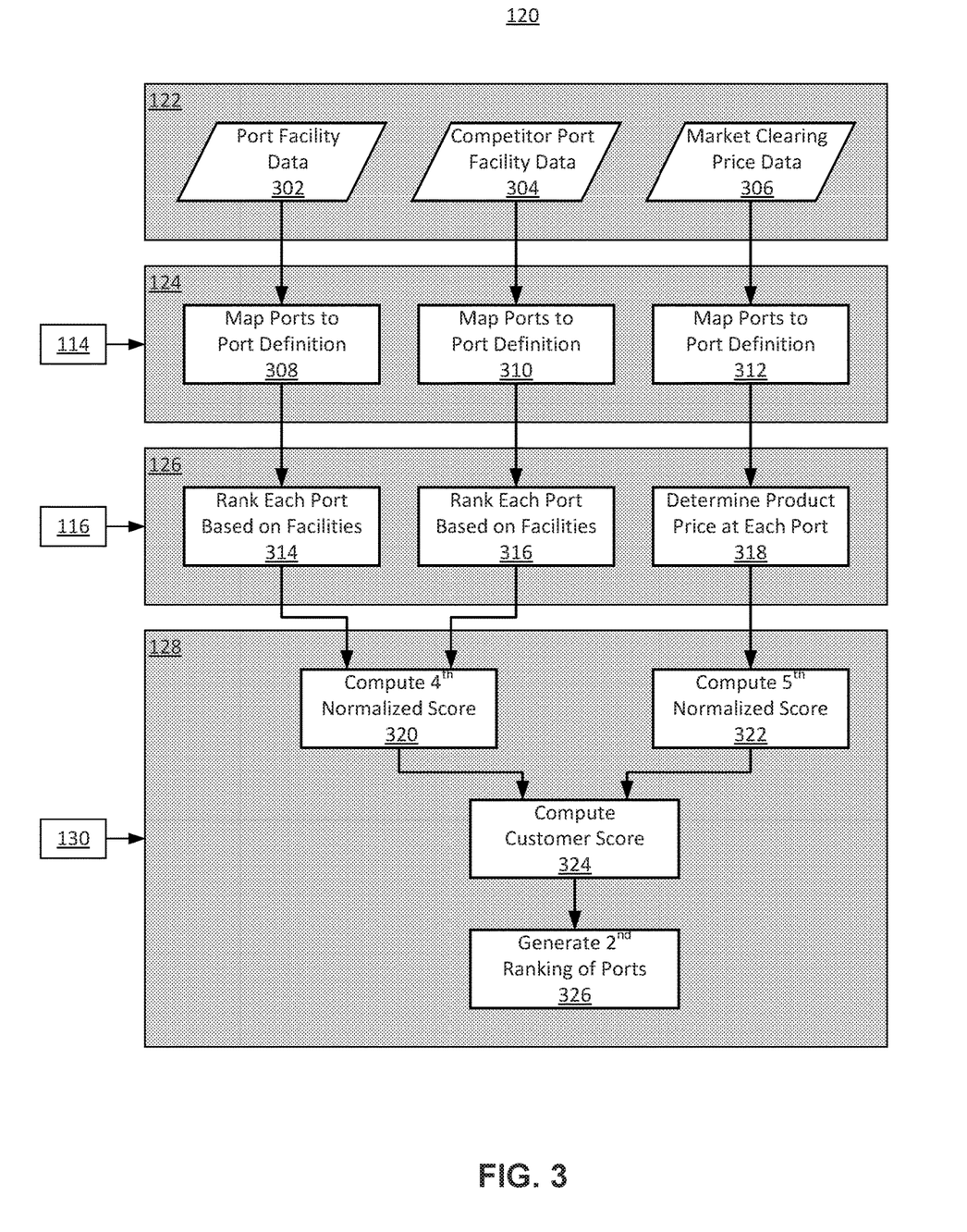
FIG. 3 is a flowchart depicting a customer view of the method of FIG. 1, according to an embodiment of the present disclosure.

FIG. 3 is a flowchart depicting the customer view 120 of the method 100 of FIG. 1, according to an embodiment of the present disclosure. FIG. 3 is a detailed view of the above-described steps 122, 124, 126, and 128 of the customer view 120.

At step 302, the method 100 retrieves port facility data from a port facility database, which is maintained by the company. The port facility database includes an International Port Directory (IPD), which outlines the company's supply facilities that are available at every port serviced by the company. The IPD contains information such as the product form available, pumping possibilities, modes of delivery (e.g., tank truck, flat truck, and barge), and lead time to service. The IPD represents the company's obligations and commitment as a contractor to its customers. The port facility data thus includes a list of facilities that the company makes available to its customers at any port and the company's delivery commitments.

Similarly, at step 304, the method 100 retrieves competitor port facility data from competitor port facility databases, which are similar to the port facility database, but maintained by the company's competitors. Therefore, each competitor port facility database outlines the competitor's supply facilities that are available at every port serviced by the competitor. All the competitor port facility databases are publicly available.

The method 100 retrieves market clearing price data from a market clearing price database at step 306. The market clearing price database is maintained by the company and includes prices at which the company sells its lubricant products at ports listed in the port facility database and prices at which the company's competitors sell their lubricant products at ports listed in the competitor port facility. The competitors' prices are typically obtained from market intelligence—i.e., through sales, marketing, and pitching activities. Thus, the market clearing price data, as its name suggests, provides, for each lubricant product, a clearing price, which corresponds to the price that the market is willing to pay for a particular lubricant product.

At steps 308, 310, and 312, the method 100 sanitizes the port facility data, the competitor port facility data, and the market clearing price data, respectively. Using the Port Definition from step 114, the method 100 maps ports in the port facility data, the competitor port facility data, and the market clearing price data to port names in the Port Definition, as described above at step 208. The method 100 may also pick exceptions and resolve ambiguities in the port names, as described above. As a result, the original ports in the retrieved data may be replaced by port names in the Port Definition, whenever needed. Once again, the ports, being consistent across the data to be processed by the method 100, thus allow these data to be correctly and accurately cross-referenced, without ambiguity.

Once the data sanitization is completed at steps 308, 310, and 312, the method 100 starts cross-referencing the databases and processing data therein at step 126.

The method 100 cross-references the ports along the trade pattern of each vessel (determined at step 116/214) with the port facility data at step 308 and the competitor port facility data at step 310. The method 100 scores each port based on the list of supply facilities stated in the company's directory and the competitors' directories. For example, each type of supply facility in a port may be assigned a different score based on its usefulness and desirability, for example, and the scores of all the supply facilities in a port may be tallied to give the port an overall score at steps 314 and 316.

Then, at step 320, the method 100 computes a comparative (a fourth) normalized score for each port based on how many competitors' supply facilities are outscored by the company's supply facilities at that port. It is to be appreciated that, in this comparison, the number of competitors may be controlled as an input for a specific output.

At step 318, for each vessel, the method 100 cross-references the lubricant product which accounts for the largest volume (determined in step 116/216) and the ports along the trade pattern of the vessel with the market clearing price data. Using market clearing prices recorded over the pre-specified time, for each vessel, the method 100 computes an average market clearing price for the vessel's most-needed lubricant product at every port visited by the vessel over the predetermined period of time. From a customer's point of view, the port with the lowest average market clearing price is desirable.

At step 322, the method 100 computes a fifth normalized score for each port based on the average market clearing price of the vessel's most-needed lubricant product at the port. The port with the lowest average market clearing price is assigned the highest fifth normalized score.

At step 324, the method 100 applies a weighting to the comparative/fourth normalized score and the fifth normalized score to rank each port for each vessel, from a customer's point of view. For example, the weighting may be in a ratio of 40% of the comparative/fourth normalized score and 60% of the fifth normalized score. Therefore, the method 100 assigns each port an overall normalized score and ranks each port accordingly for each vessel at step 326, from a customer's point of view. As a result, the method 100 generates the second ranking of the plurality of ports. The second ranking allows the company and its customers to identify the port with the highest overall normalized score as the port at which to supply each of the customers' vessels with its most-needed lubricant product at the most economical price. In other words, the second ranking represents the customer's best lubricant product buying point(s) based on the company's advantages over its competitors and the market clearing price.

Referring back to FIG. 1, at step 130, for each vessel, the method 100 allows the company to review with its corresponding customer (i.e., owner of the vessel) the first and second rankings of the plurality of ports and come up with the best value proposition for the customer in selecting one or more ports that are economically and operationally optimal for the supply of lubricant products to the vessel in question. Alternatively, the method 100 may compare the first and second rankings of the plurality of ports to determine the most probable ports where lubricant will be demanded and supplied, allowing the company to arrive at the best value proposition for its customers. Based on the outcomes from step 130, the weighting factors used in steps 118 and 128 may be fine-tuned to better align with the company's goals.

In an embodiment, a price delta between the ranked ports may be used to set ratios. For example, if the price delta is higher or lower than 10 cents per liter, initial inventory can be allocated based on port location. For new business, if the top four ports cost per liter (CPL) delta is greater than 10 cents, inventory may be allocated 50%, 30%, 10%, and 10% to ports 1-4, respectively. If the CPL delta is less than 10 cents, the ratios 30%, 30%, 30%, and 10% may be applied to these ports, respectively.

As stated previously, at step 140, the method 100 then allows the company to plan, based in part on the Global Warehouse database and the Global Supplier database, for capacity in a future horizon, inventory, production, and supply of lubricant products required by its customers' vessels. At this stage, the method 100 also enables the company to develop new sales pitches to prospective customers.

The advantages that the method 100 brings to the company are severalfold. For instance, the method 100 allows the company to lay out its benefits as compared to its competitors for a specific fleet of vessels and highlight the associated costs. This represents the company's value proposition to its prospective customers. Moreover, the company is able to tailor an optimal supply security map based on the customers' existing trade patterns, which result from the AIS data of the customers' vessels. The method 100 can map the best ports for the company's prospective customers' fleets and create tailored inventory plans specific to their fleets. Additionally, the method 100 may run through the company's list of prospective vessels for a number of upcoming years (e.g., 5 years) to assess the level of demand at the various ports. The method 100 may run through its existing list of vessels to identify the best ports of call, cross-reference them with twelve months sales data, for example, and map onto warehouses and production facilities to arrive at an inventory plan and a raw material plan. The method 100 also allows the company to identify trade changes and pro-actively realign its inventory and production.

Figure 4:
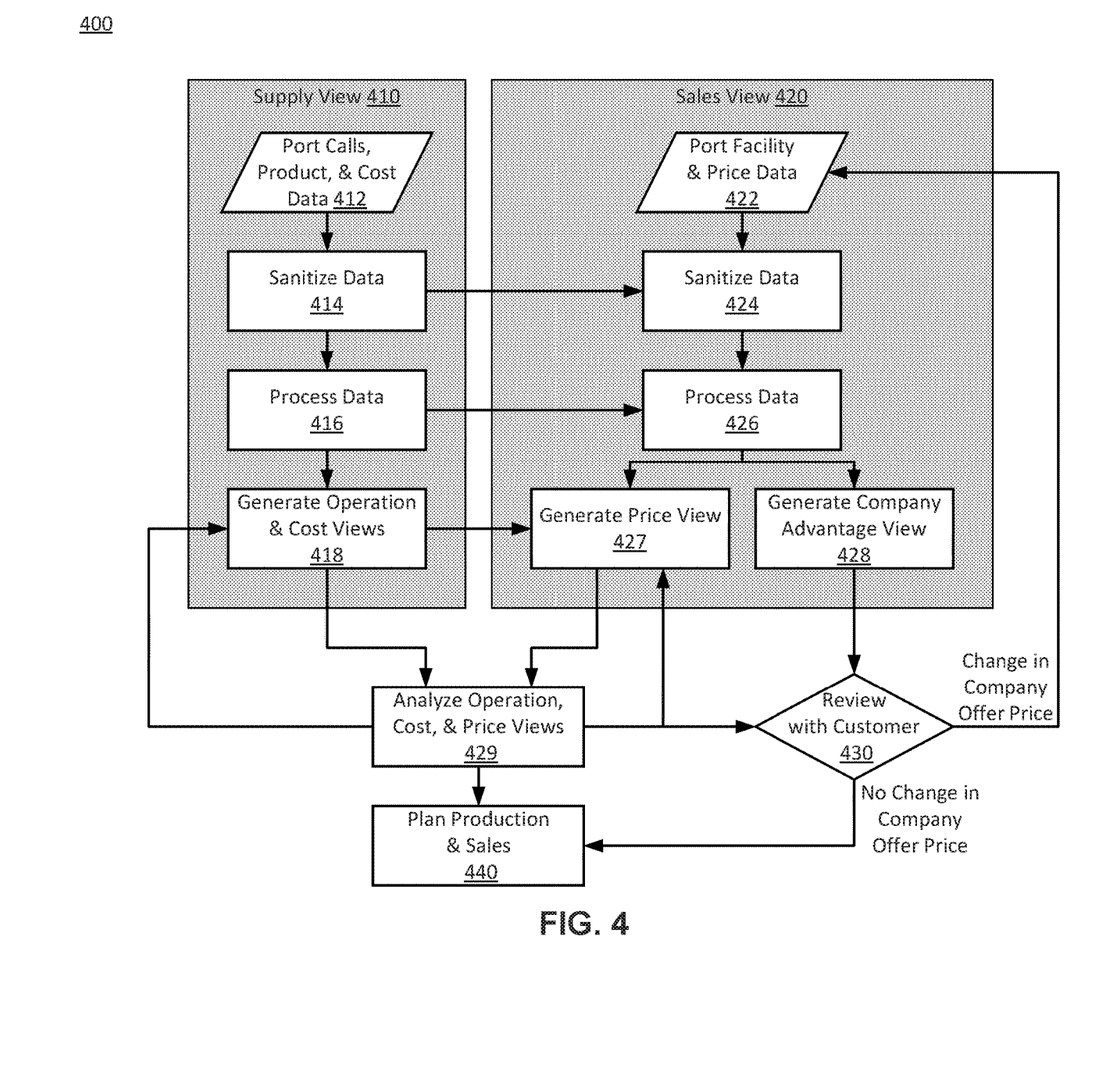
FIG. 4 is a flowchart depicting a method of optimizing a supply of a lubricant product to a vessel, according to an embodiment of the present disclosure.

FIG. 4 is a flowchart depicting a method 400 of optimizing a supply of a lubricant product to a vessel, according to an embodiment of the present disclosure. The method 400 includes a supply view 410 and a sales view 420, which will be described in details below with respect to FIGS. 5 and 6, respectively.

In the supply view 410, the method 400 retrieves data containing port calls made at a plurality of ports by a plurality of vessels, lubricant products used by the plurality of vessels, and costs of the lubricant products from one or more databases at step 412, the data at step 414 to allow for accurate cross-referencing of the data, processes the data at step 416, and generates an operation view and a cost view from the company's supply point of view for every vessel out of the plurality of vessels. The operation view is a first ranking of the plurality of ports based on the port calls data for every vessel. The cost view is a second ranking of the plurality of ports based on the port calls data and the costs of the lubricant products for every vessel.

Figure 5:
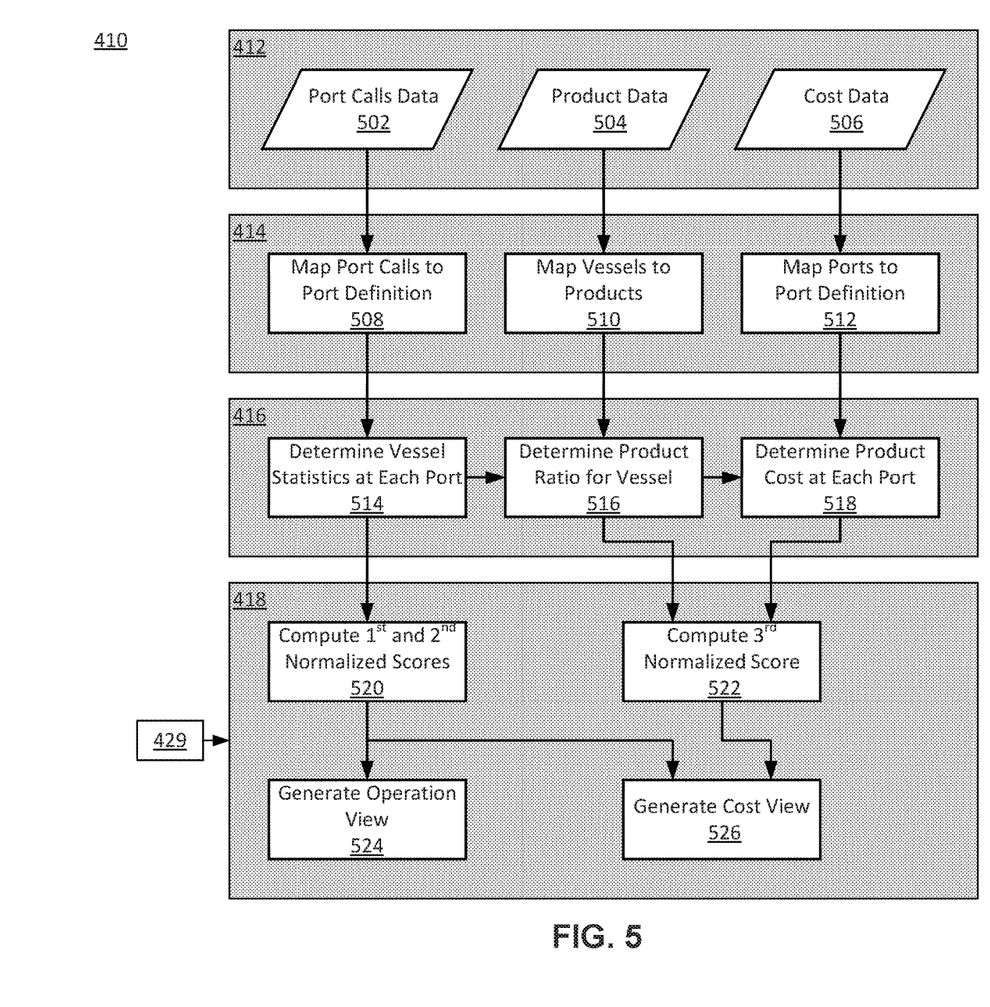
FIG. 5 is a flowchart depicting a supply view of the method of FIG. 4, according to an embodiment of the present disclosure.

FIG. 5 is a flowchart depicting details of the steps 412, 414, 416, and 418 of the supply view 410 of the method 400 in FIG. 4, according to an embodiment of the present disclosure. Steps 502-522 are the same as steps 202-222 of the method 100 described above. Therefore, the description of steps 502-522 will be omitted here.

At step 524, the method 400 applies a weighting to the first and second normalized scores from step 520 to generate the operation view. For example, the weighting may be in a ratio of 30% of the first normalized score and 10% of the second normalized score. The operation view is a first ranking of the plurality of ports for every vessel, purely in terms of ports where the vessel had the most calls and spent the most amount of time.

At step 526, the method 400 applies a weighting to the first and second normalized scores from step 520 and the third normalized score from step 522 to generate the cost view. For example, the weighting may be in a ratio of 30% of the first normalized score, 10% of the second normalized score, and 60% of the third normalized score. The cost view is a second ranking of the plurality of ports for every vessel, from the company's supply point of view. The second ranking allows the company to identify the port that provides the most comfortable time period or window of opportunity to supply each vessel with its most-needed lubricant product at the most economical cost. In other words, the second ranking allows the company to identify its best lubricant product delivery point(s).

It is to be appreciated that the ratios in generating the operation view and the cost view may be adjusted based on the performance of the method 400 and the goals of the company and market conditions and sentiment.

In the sales view 420 of FIG. 4, the method 400 retrieves data containing lists of port facilities at ports serviced by either the company or the company's competitors, and prices for the lubricant products from one or more databases at step 422, sanitizes the data at step 424 with input from step 414, processes the data at step 426 with input from step 416, and generates a price view at step 427 and a company advantage view at step 428 for every vessel out of the plurality of vessels. The price view is a third ranking of the plurality of ports based on the port calls data and the prices of the lubricant products, for every vessel out of the plurality of vessels. The company advantage view is a fourth ranking of the plurality of ports based on the port facilities for every vessel.

Figure 6:
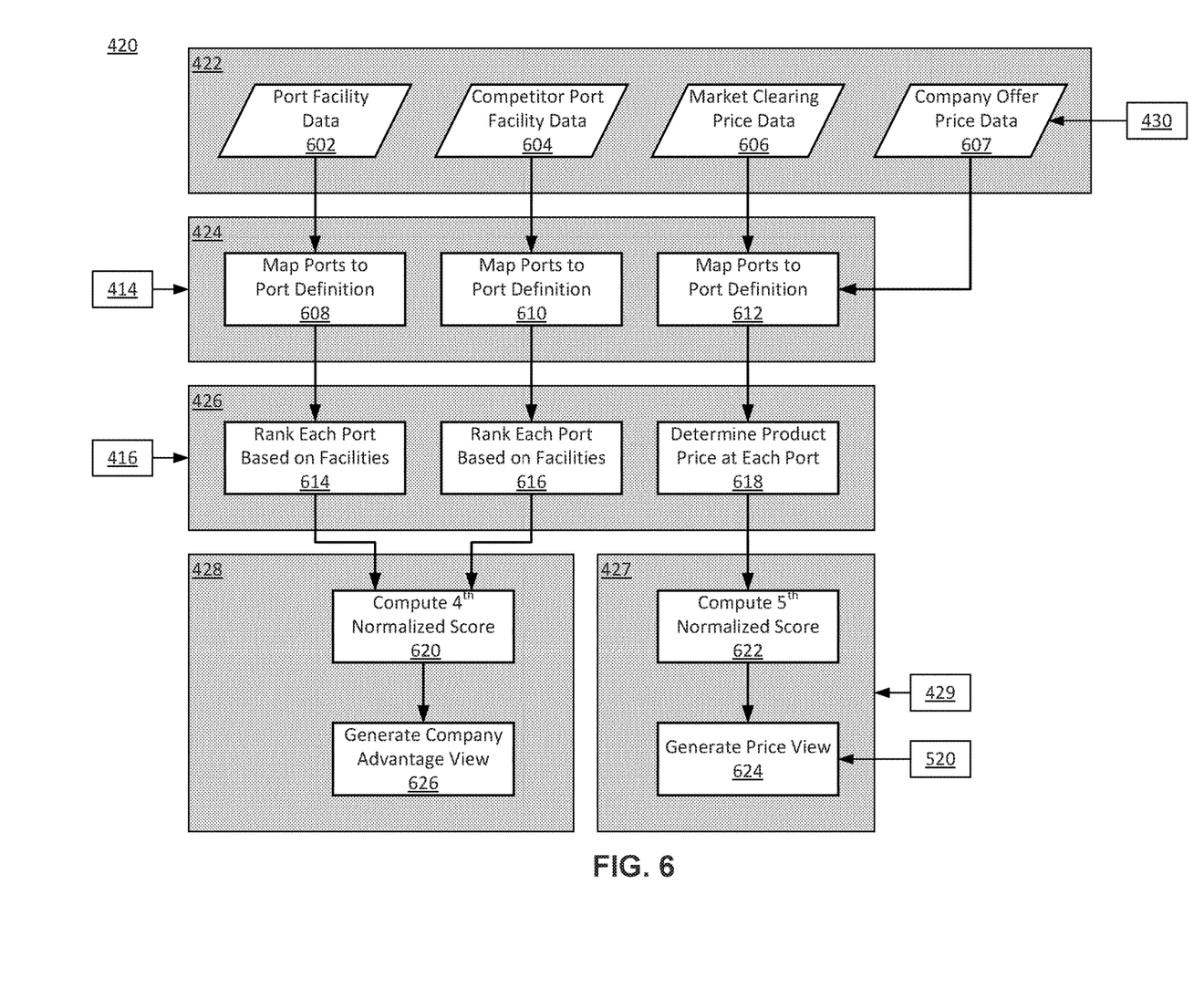
FIG. 6 is a flowchart depicting a customer view of the method of FIG. 4, according to an embodiment of the present disclosure.

FIG. 6 is a flowchart depicting details of the steps 422, 424, 426, 427, and 428 of the sales view 420 of the method 400 of FIG. 4, according to an embodiment of the present disclosure. Steps 602-606 and 608-622 are the same as steps 302-306 and 308-322 of the method 100 described above, except in step 422, wherein the method 400 additionally retrieves company offer price data from a company offer price database at step 607, and the method 400 also maps the company offer price data to port names in the Port Definition at step 612, as described above at step 208. The company offer price database is maintained by the company and includes prices at which the company has offered to sell lubricant products to existing and potential customers. The description of steps 602-606 and 608-622 will be omitted here.

At step 624, the method 400 applies a weighting to the first and second normalized scores from step 520 and the fifth normalized score from step 622 to generate the price view. For example, the weighting may be in a ratio of 30% of the first normalized score, 10% of the second normalized score, and 60% of the fifth normalized score. The price view is a third ranking of the plurality of ports for every vessel, from the customer's view of the company's operations. The third ranking allows the company and its customers to identify the port with the highest overall normalized score as the port at which the company can supply each of the customers' vessels with its most-needed lubricant product at the most economical price. In other words, the third ranking represents the customer's best lubricant product buying point(s) from the company, regardless of the company's competitors' operations.

At step 626, the method 400 generates the company advantage view based on the fourth normalized score from step 620. The company advantage view is a fourth ranking of the plurality of ports for every vessel, based on a comparison of the company's supply facilities and those of its competitors. The company advantage view thus allows the company to showcase, to its customers, its advantages over its competitors (at step 430, for example).

Referring back to FIG. 4, at step 429, the method 400 allows the company to analyze the operation and cost views from step 418 and the price view from step 427 for ports that are economically and operationally optimal, both from the company's and its customers' points of view. Using the analysis at step 429, the company may adjust how the method 400 generates the operation and cost views at step 418 and the price view at step 427. For instance, if a customer has critical operations and thus favors operation efficiency over price, the weighting factor for the third normalized score may be reduced (e.g., to 50%) at step 524.

At step 430, based on the analysis at step 429, the method 400 allows the company to review, with its customers, sales of one or more lubricant products for one or more of the customers' vessels, taking into consideration the company's advantages over its competitors according to the company advantage view from step 428/626. Here, the method 400 allows the company to arrive at the best value proposition for the customers, aiming at expanding the company's supply of lubricant products to the customers' vessels. At step 430, if the company changes its offer price for a lubricant product to the customers, the method 400 updates a company offer price database invoked at step 422/607. Otherwise, the method 400 moves to step 440 and uses the analysis from step 429 and information from the Global Warehouse and Global Supplier databases to allow the company to plan for capacity in a future horizon, inventory, production, and supply of lubricant products required by its customers' vessels at one or more ports.

In addition to the advantages provided by the method 100, the method 400 allows the company to drive the prices of the lubricant products and control margin management since the company can control supply of lubricant products based on how the company price contracts with its customers. Additionally, the method 400 allows greater flexibility in capturing customers' behaviors based on the criticality of the customers' operations, for example.

It is to be appreciated that each of the methods 100 and 400 may be performed by a computer system including a plurality of processors. The computer system may include secondary or tertiary storage to allow for non-volatile or volatile storage of instructions to be executed by the plurality of processors to perform the method 100 or 400, and for storage of the port calls, product, cost, port Facility, competitor port facility, and market clearing price data, the sanitized data, the processed data, and the outputs generated by the method 100 or 400. The computer system may also include one or more display units to display the data retrieved from the databases and the sanitized data, the processed data, and the different scores generated by the method 100 or 400, for review and analysis by individuals at the company. The computing system may be entirely contained at one location or may also be implemented across a closed or local network, a cluster of directly connected computers, an internet-centric network, or a cloud platform. It is to be further appreciated that the method 100 or 400 is not limited to any particular programming language or execution environment, and may be applied to any computer programming languages or logic.

Embodiments of the present disclosure are specifically illustrated and/or described herein. However, it is to be appreciated that modifications and variations of the disclosure are covered by the above teachings and within the purview of the appended claims without departing from the spirit and intended scope of the disclosure. Further variations that are consistent with the principles described above are permissible.

What is claimed is:

1. A method of optimizing a supply of a lubricant product to a vessel, comprising:
   assigning a unique international maritime organization (IMO) number for the vessel;
   representing movement of the vessel with a vector using an Automatic Identification System (AIS) transponder and the assigned IMO number;
   automatically tracking the vessel using the vector and an AIS database to identify and locate the vessel by electronically exchanging data with a plurality of nearby vessels using AIS transponder base stations and satellites;
   extracting a trade pattern for the vessel based on calls made to a plurality of ports, a number of hours the vessel spent at each of the plurality of port calls, and vessel speed data;
   retrieving, by the processor, port facility data from a port facility database;
   retrieving, by the processor, lubricant product data for the vessel from a product database using the IMO number;
   generating, by the processor, a first ranking of the plurality of ports based on the trade pattern of the vessel and net delivery costs of the lubricant product at the plurality of ports based on the data retrieved from the port facility and product databases;
   generating, by the processor, a second ranking of the plurality of ports based on lubricant-supplying facilities present at the plurality of ports and market clearing prices of the lubricant product at the plurality of ports based on the data retrieved from the port facility and product databases; and
   selecting one of the plurality of the ports based on the first ranking and the second ranking; and
   supplying the lubricant product to the vessel at the selected port,
   wherein the generating the first ranking comprises, for each of the plurality of ports:
   computing, by the processor, a first normalized score based on the number of calls;
   computing, by the processor, a second normalized score based on the number of hours;
   computing, by the processor, a third normalized score based on the net delivery cost of the lubricant product at the corresponding port; and
   generating, by the processor, a supply score by weighing the first normalized score by a first factor, the second normalized score by a second factor, and the third normalized score by a third factor.

2. The method of claim 1, further comprising:
retrieving, by the processor, the plurality of ports from the locational data of the vessel over a predetermined period of time, wherein the plurality of ports are ports visited by the vessel.

3. The method of claim 1, further comprising:
retrieving, by the processor, a list of products used by the vessel from the product database over a predetermined period of time;
calculating, by the processor, a product ratio based on the list of products; and
selecting, by the processor, from the list of products, a product corresponding to the highest ratio in the product ratio as the lubricant product.

4. The method of claim 1, further comprising:
retrieving, by the processor, the net delivery costs from a cost database.

5. The method of claim 1, further comprising, for each of the plurality of ports:
accumulating, by the processor, from the locational data over a predetermined period of time, a number of hours spent by the vessel at the corresponding port; and
counting, by the processor, from the locational data over the predetermined period of time, a number of calls made by the vessel at the corresponding port.

6. The method of claim 5, wherein the first, second, and third factors are 30%, 10%, and 60%, respectively.

7. The method of claim 1, further comprising:
retrieving, for each of the plurality of ports, a list of lubricant-supplying facilities from a facility database.

8. The method of claim 7, wherein the generating the second ranking comprises, for each of the plurality of ports:
computing, by the processor, a fourth normalized score based on the list of lubricant-supplying facilities;
computing, by the processor, a fifth normalized score based on the market clearing price of the lubricant product at the corresponding port; and
generating, by the processor, a customer score by weighing the fourth normalized score by a fourth factor, and the fifth normalized score by a fifth factor.

9. The method of claim 8, wherein the fourth factor is 40% and the fifth factor is 60%.

* * * * *